Patented Aug. 23, 1932

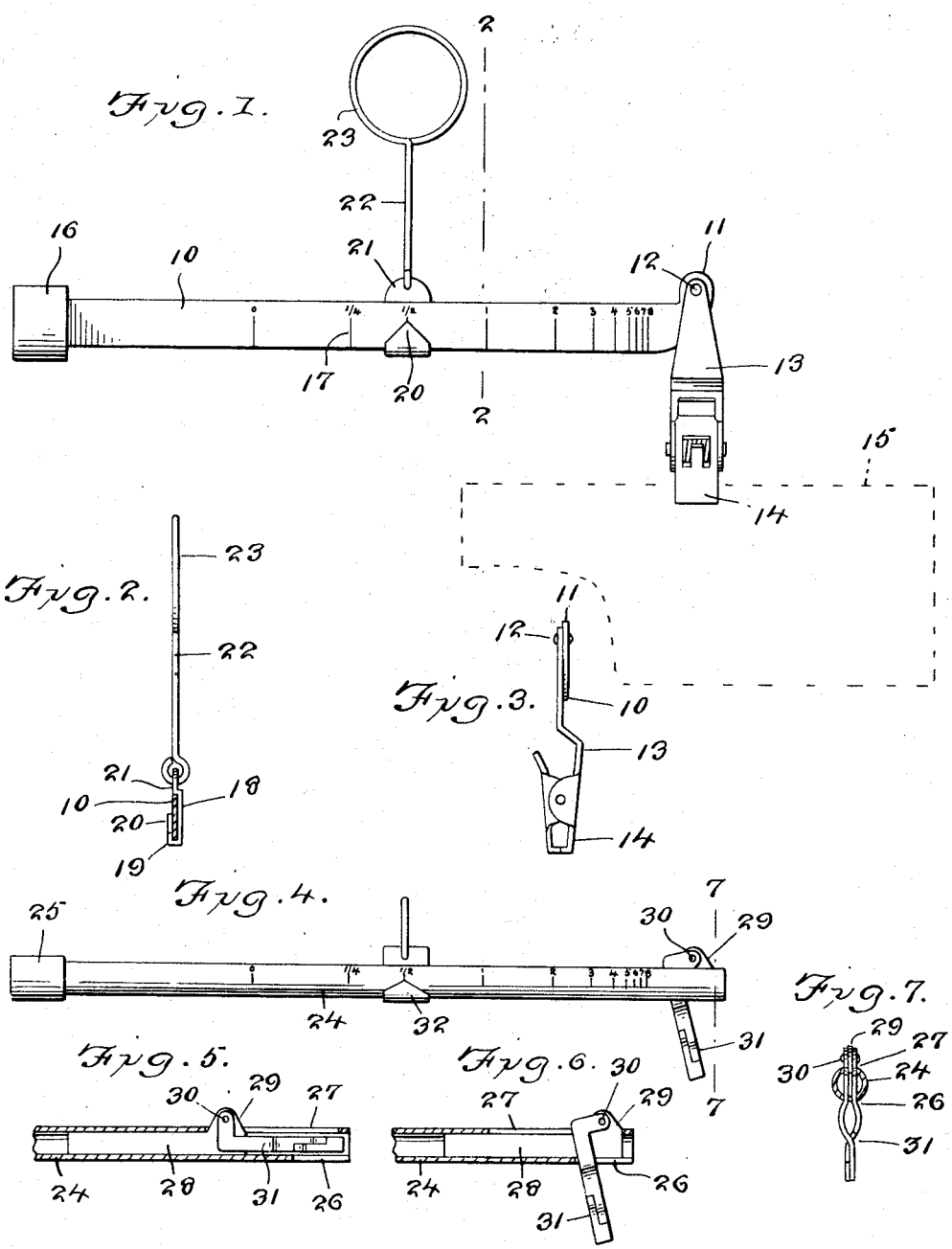

1,872,646

UNITED STATES PATENT OFFICE

HENRY J. BEHRENS, OF LOWVILLE, NEW YORK

SCALE

Application filed June 24, 1929. Serial No. 373,269.

This invention relates to scales especially adapted for weighing mail and other relatively light articles, an object being to provide a scale of this character which may be conveniently carried in the pocket of the user so as to be at all times handy for use.

Another object of the invention is the provision of a scale which is simple in construction, accurate in use, and by means of which very light articles may be weighed.

With the above and other objects in view, the invention further includes the following novel features and details of construction, to be hereinafter more fully described, illustrated in the accompanying drawing and pointed out in the appended claims.

In the drawing:—

Figure 1 is an elevation of a scale constructed in accordance with the invention.

Figure 2 is a section on the line 2—2 of Figure 1.

Figure 3 is an end view.

Figure 4 is an elevation showing a slightly different form of the invention.

Figure 5 is a longitudinal sectional view through one end of the scale shown in Figure 4 with the article attaching member folded within the beam.

Figure 6 is a view similar to Figure 5 with the article attaching member arranged in position for use.

Figure 7 is a sectional view on the line 7—7 of Figure 4.

Referring to the drawing in detail wherein like characters of reference denote corresponding parts, the form of the invention which is illustrated in Figures 1, 2 and 3, comprises a beam 10. This beam is formed from a strip of flat metal and is provided at one end with an offset extremity 11 to which is pivotally secured as shown at 12, an attaching member 13. This member may be of any suitable character which will conveniently grip the article to be weighed, the member shown comprising a pair of spring influenced clamping jaws 14 which are especially designed for quickly engaging and releasing a piece of mail matter such as is indicated by the dotted lines at 15 in Figure 1 of the drawing. The opposite end of the beam 10 carries a weight 16.

The beam is graduated as indicated at 17, the graduations representing ounces and fractions thereof, the space between the graduations of course decreasing toward the end of the beam to which the article attaching member is secured. The beam is of course calibrated in accordance with its length and the weight 16 and the graduations may extend from an exceedingly small fraction of an ounce to one pound or more if desired.

Slidable longitudinally of the beam is a fulcrum member which is formed of a piece of flat metal shaped to provide a base 18 which extends transversely across the rear face of the beam 10. This base is provided at one end with an extension 19 which frictionally grips the beam and which terminates in an indicator or pointer 20. Extending from the opposite end of the base is an offset ear 21 which is provided with an opening whereby the ear may be pivotally connected to one end of a link 22. The construction of this member thus provides a sliding and frictional engagement with the beam so that the pointer 20 may be adjusted longitudinally of the beam in accordance with the article to be weighed.

The link is provided with a loop 23 at its outer end, by means of which the scale may be suitably suspended. The pivotal connection between the link 22 and the ear 21 is spaced from the beam a distance equal to the offset of the pivotal connection 12 of the article attaching member so that these pivot points will be upon the same horizontal plane when the scale is in use.

The scale is of a character whereby the article attaching member and the suspending member may be arranged substantially parallel to the beam for convenience in carrying, and if desired the clamping jaws 14 may be engaged in the loop 23 when the scale is not in use.

In Figures 5, 6 and 7 the beam which is indicated at 24 is of tubular construction. A weight 25 closes one end of the beam, while the opposite end of the beam is slotted as indicated at 26 and 27.

Slidable within the tubular beam is a member 28 which is provided with an ear 29. This ear extends through the slot 27 and has pivotally secured thereto as shown at 30 a substantially L-shaped article attaching member 31. This member 31 may be housed within the tubular beam when the scale is not in use. To accomplish this, the outer end of the article attaching member 31 is swung upward from the position shown in Figure 6 so that the slide may be moved inward with the member 31 arranged within the beam as shown in Figure 5. The opposite ends of the slot 27 limit movement of the slide 28 in opposite directions.

The fulcrum member which is indicated at 32 is somewhat similar to the member shown in Figures 1 and 2, except that the rear or base portion of the member 32 is shaped to conform to the shape of the tubular beam.

The invention is susceptible of various changes in its form, proportions and minor details of construction and the right is herein reserved to make such changes as properly fall within the scope of the appended claims.

Having described the invention what is claimed is:—

1. In a scale, a beam graduated upon one face, an article attaching member pivotally secured thereto at one end thereof, a weight at the opposite end of the beam, a fulcrum member formed of metal and slidable upon and frictionally engaging the beam, said fulcrum member comprising a flat body portion, an extension at one end thereof, said extension frictionally engaging the beam and terminating in an indicator disposed upon the graduated face of the beam and an offset ear extending from the opposite end of the fulcrum member, and a suspending member pivotally secured to the offset ear.

2. In a scale, a beam graduated upon one face, an offset extremity extending from the upper edge of the beam, an attaching member pivotally secured to said offset extremity, a weight at the opposite end of the beam, a fulcrum member slidable longitudinally of the beam, an ear extending from the fulcrum member and spaced from the beam a distance equal to the offset extremity of the beam and a suspending member pivotally secured to the ear upon susbtantially the same horizontal plane with the attaching member.

In testimony whereof I affix my signature.

HENRY J. BEHRENS.